US012183142B1

(12) United States Patent
Roy et al.

(10) Patent No.: US 12,183,142 B1
(45) Date of Patent: Dec. 31, 2024

(54) SECURE STORAGE OF CONTROLLED SUBSTANCES

(71) Applicants: Ronald B. Roy, Coral Springs, FL (US); Dore Scott Perler, Coral Springs, FL (US)

(72) Inventors: Ronald B. Roy, Coral Springs, FL (US); Dore Scott Perler, Coral Springs, FL (US)

( * ) Notice: Subject to any disclaimer, the term of this patent is extended or adjusted under 35 U.S.C. 154(b) by 109 days.

(21) Appl. No.: 18/092,870

(22) Filed: Jan. 3, 2023

Related U.S. Application Data

(60) Provisional application No. 63/296,278, filed on Jan. 4, 2022.

(51) Int. Cl.
*G07C 9/00* (2020.01)
*F25D 23/12* (2006.01)

(52) U.S. Cl.
CPC ......... *G07C 9/00912* (2013.01); *F25D 23/12* (2013.01); *G07C 2009/00634* (2013.01); *G07C 2009/00769* (2013.01)

(58) Field of Classification Search
CPC ...... G07C 9/00912; G07C 2009/00634; G07C 2009/00769; F25D 23/12
USPC .......................................................... 340/5.61
See application file for complete search history.

(56) References Cited

U.S. PATENT DOCUMENTS 3,624,761 A * 11/1971 Kohn ...................... E05B 81/10 180/289
4,784,415 A * 11/1988 Malaval .................. E05B 47/00 292/144
5,216,909 A * 6/1993 Armoogam ......... E05B 47/0603 292/144
5,609,051 A * 3/1997 Donaldson ........... G07C 9/0069 70/303 A
5,746,458 A * 5/1998 Fisher ................... E05B 65/108 292/144
6,035,675 A * 3/2000 Zimmer ................ E05B 47/026 70/276
6,539,755 B1 * 4/2003 Bruwer ............... E05B 47/0607 70/279.1
7,336,150 B2 * 2/2008 Gokcebay ............... E05B 47/06 70/432
7,520,152 B2 * 4/2009 Sabo ....................... E05B 63/18 292/144

(Continued)

*Primary Examiner* — Nam V Nguyen

(74) *Attorney, Agent, or Firm* — Mark D. Bowen, Esq.; Malin Haley DiMaggio & Bowen, P.A.

(57) ABSTRACT

A secure electronic enclosure comprising a storage apparatus having very lower power consumption is designed for operation in a standard consumer refrigerator to protect children from access to potentially dangerous substances, such as medications, drugs, or other articles and substances. A lockable access door is devoid of any knobs or handles and is controlled by an electronic access control system which is preferably responsive to an electronic access control device such as a card reader, key fob, or smart phone interface. In a preferred embodiment, the access door latching system incorporates springs which facilitate the automatic opening of the door upon authentication by the electronic access control system. Incorporating spring-assisted latching allows the system to consume very little electrical power whereby the batteries are capable of lasting up to one year with daily use.

8 Claims, 4 Drawing Sheets

(56) References Cited

U.S. PATENT DOCUMENTS

| | | | | |
|---|---|---|---|---|
| 8,272,169 | B2 * | 9/2012 | Mahdi | E05B 15/022<br>292/137 |
| 8,756,764 | B2 * | 6/2014 | Daughtridge, Jr. | F24C 1/00<br>16/388 |
| 10,858,864 | B2 * | 12/2020 | Pfunder | E05B 17/2011 |
| 10,878,373 | B2 * | 12/2020 | Bashkin | G07C 9/37 |
| 11,719,032 | B2 * | 8/2023 | Zhi | E05F 1/105<br>16/72 |

* cited by examiner

SECURE STORAGE OF CONTROLLED SUBSTANCES

CROSS REFERENCE TO RELATED APPLICATIONS

This application claims the benefit of provisional U.S. Patent Application No. 63/296,278 filed on Jan. 4, 2022.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to secure storage devices, and more particularly to an electronic storage enclosure configured to operate within minimal power consumption and suitable for use in a standard refrigerator to prevent unauthorized access to controlled substances.

2. Description of Related Art

Electronic storage devices are commonplace. People use storage devices (e.g. lock boxes) to securely store a wide variety of items, including medications, legalized drugs, weapons, etc. A number of medications further require storage in refrigerated environments. In households where children are present simply storing such medications in the family refrigerator accessible to children presents a dangerous situation as the children have easy access to such medications. The background art fails to provide commercially available electronic storage devices designed to be placed in, and used in, a refrigerated environment. A further limitation in the background art relates to power consumption required by conventional electronic storage devices. More particularly, the batteries that provide a power source for the electro-mechanical components are affected by cold temperatures. Conventional batteries work though an electrochemical reaction which slows down in cold temperatures thereby causing the batteries to discharge more quickly.

Accordingly, there exists a need in the art for advancements in the field of secure storage devices.

There further exists a need for a self-contained electronic storage device specifically designed for use in refrigerated environments.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The present invention overcomes the limitations and disadvantages present in the art by providing a secure electronic enclosure comprising a storage apparatus which is characterized as having very lower power consumption and is designed for operation in a standard consumer refrigerator to protect children from access to potentially dangerous substances, such as medications, drugs, or other articles and substances. A secure electronic enclosure in accordance with the present invention comprises an enclosure having a lockable access door controlled by an electronic access control system. The electronic access control system is preferably responsive to an electronic access control device such as a card reader, key fob, or smart phone interface. The electronic access control system is responsive to the access control device to operate an access door latching system. In a preferred embodiment, the access door latching system incorporates springs which facilitate the automatic opening of the door upon authentication by the electronic access control system. Incorporating spring-assisted latching allows the system to consume very little electrical power whereby the batteries are capable of lasting up to one year with daily use.

Accordingly, it is an object of the present invention to provide advancements in the field of secure enclosures.

Still another object of the present invention is to provide an electronic storage apparatus that requires very little power to operate and includes electronics optimized for operation in refrigerated environments.

Yet another object of the present invention is to provide an electronic secure enclosure that is devoid of any exterior handles or knobs.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word “connected” is used. By “connected” is meant that the article or structure referred to is joined, either directly, or indirectly, to another article or structure. By “indirectly joined” is meant that there may be an intervening article or structure imposed between the two articles which are “coupled”. “Directly joined” means that the two articles or structures are in contact with one another or are essentially continuous with one another. By adjacent to a structure is meant that the location is near the identified structure.

Also, as used in the specification including the appended claims, the singular forms “a,” “an,” and “the” include the plural, and reference to a particular numerical value includes at least that particular value, unless the context clearly dictates otherwise. Ranges may be expressed herein as from “about” or “approximately” one particular value and/or to “about” or “approximately” another particular value. When such a range is expressed, another embodiment includes from the one particular value and/or to the other particular value. Similarly, when values are expressed as approximations, by use of the antecedent “about,” it will be understood that the particular value forms another embodiment.

“Exemplary” may be used herein to mean “serving as an example, instance, or illustration.” Any aspect described in this document as “exemplary” may not necessarily be construed as preferred or advantageous over other aspects.

Figure 1:
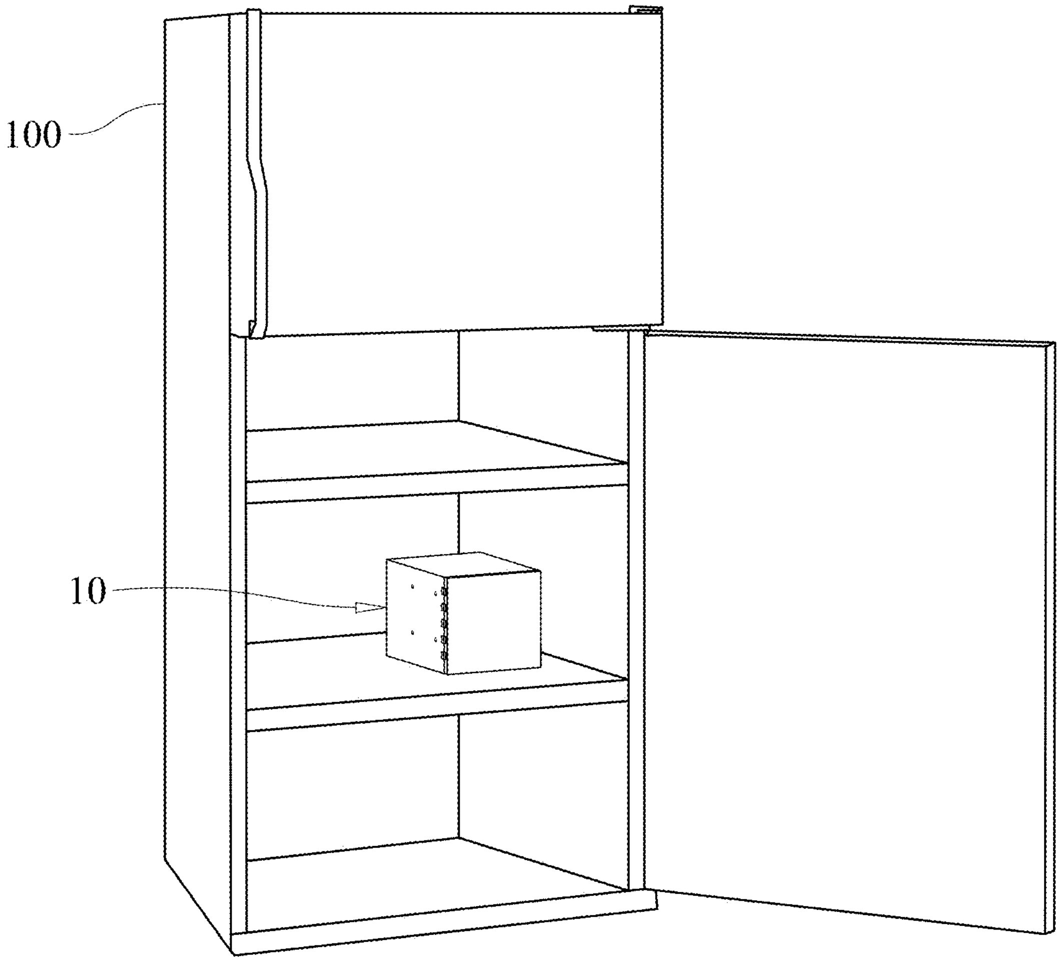
FIG. 1 illustrates an electronic secure enclosure within a refrigerator.

With reference now to the drawings, FIGS. 1-6 disclose a secure electronic enclosure, generally referenced as 10, in accordance with the present invention. FIG. 1 illustrates the placement of secure electronic enclosure 10 within a household refrigerator, referenced as 100. As disclosed herein above an intended use of a secure electronic enclosure 10 according to the present invention is to function as a lockbox within a refrigerated environment.

Figure 2:
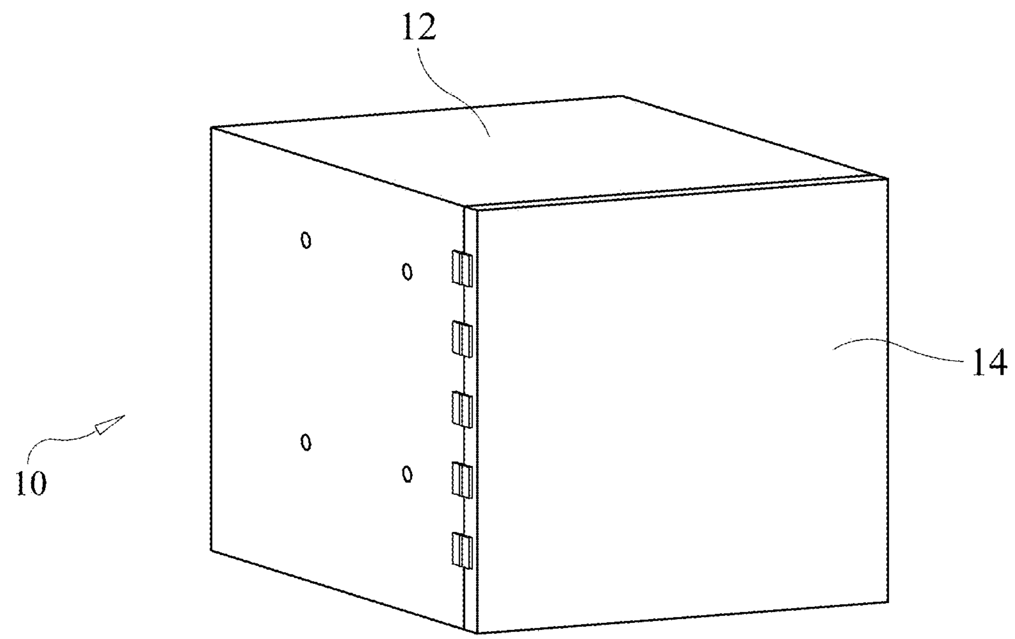
FIG. 2 is a front perspective view of the secure electronic enclosure with the access door closed.
Figure 3:
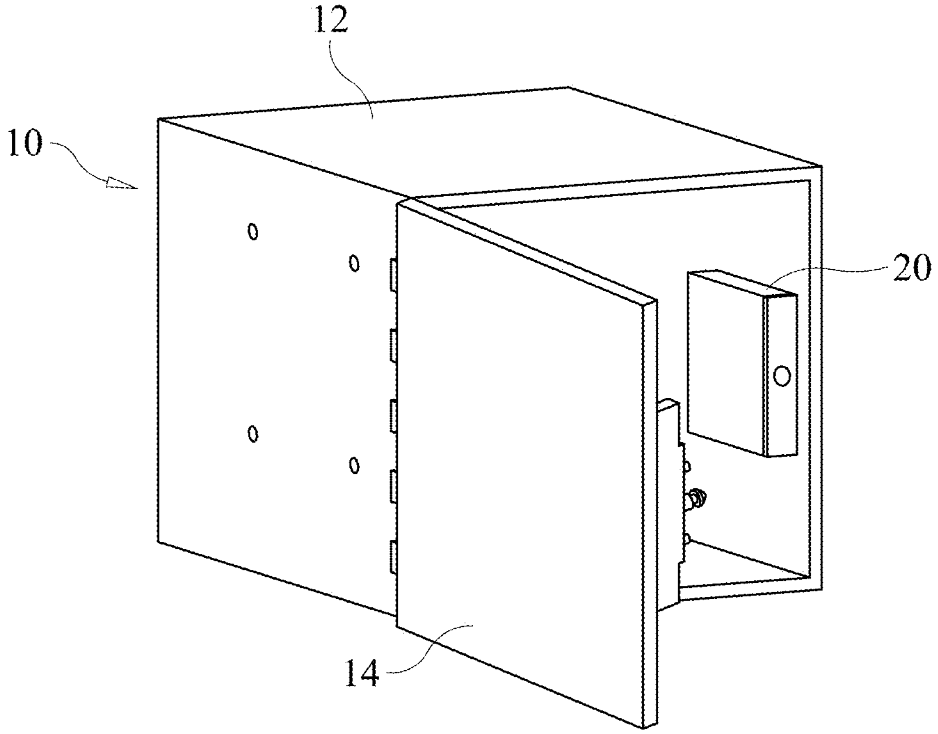
FIG. 3 is a front perspective view of the secure electronic enclosure with the access door partially open.

As best seen in FIGS. 2 and 3, in one contemplated embodiment secure electronic enclosure 10 comprises a 5-sided main body 12 having a lockable access door 14. Main body 12 may comprise a solid 5-sided cube having equal sides; however, any suitable shape is considered within the scope of the present invention. When configured with 5-sides, main body 12 may comprise one contiguous piece as in 3-D printed or injection molded or alternatively may be formed of multiple pieces of wood or metal connected together. Access door 14 is preferably connected to main body 12 via a hinge 16 and is configurable between a closed configuration as shown in FIG. 2 and an open configuration as seen in FIG. 3. In an alternate embodiment, access door 14 may be removably connected to main body 12 without the use of hinges. An important aspect of access door 14 is that it is devoid of any external handles, knobs, or other grasping structure or electronic sensors. It is considered an important aspect of the present invention that the exterior of the electronic secure enclosure not include, or reveal, any external components that would cause an observer to glean that the device is a storage unit.

Figure 4:
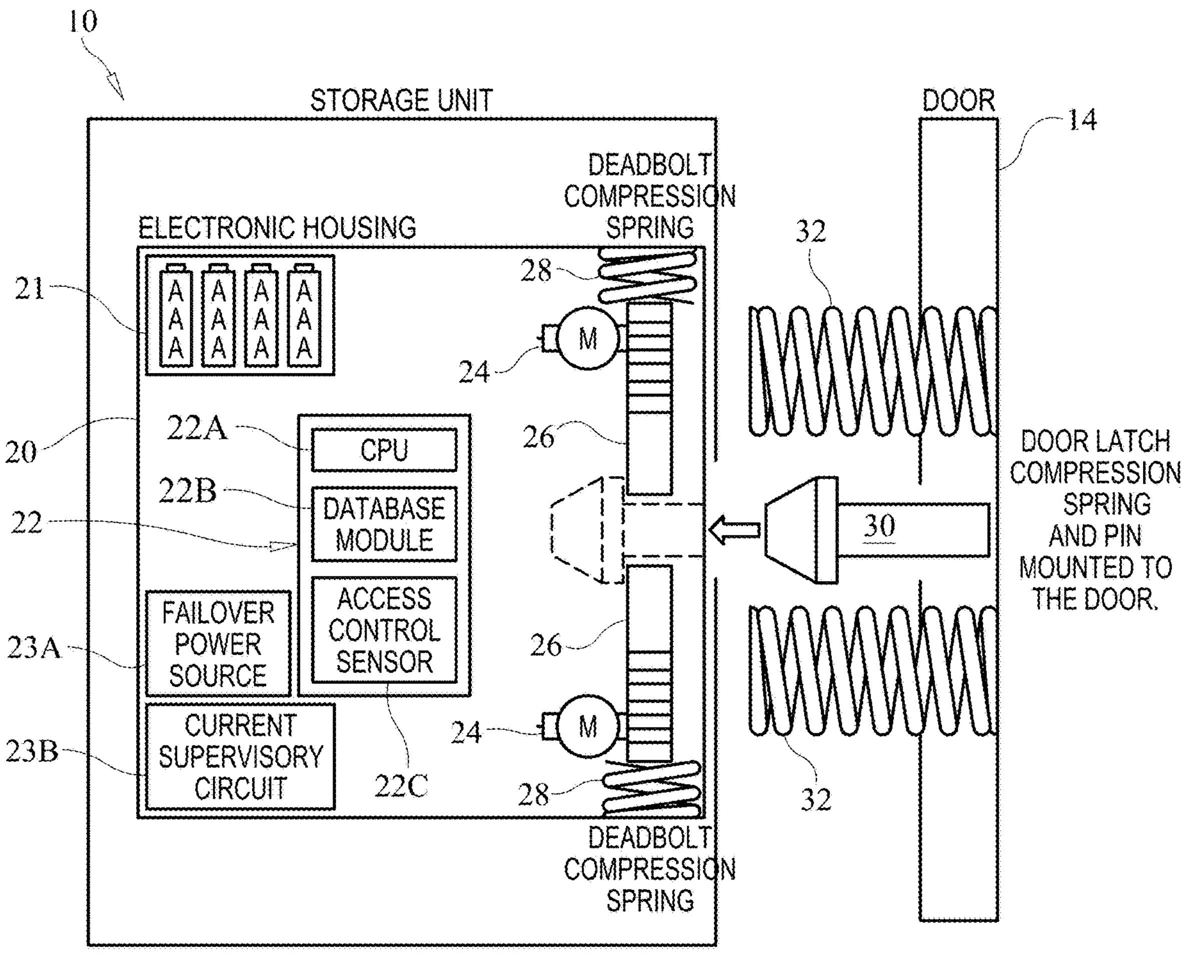
FIG. 4 is a schematic block diagram of the electro-mechanical components of the access control system for latching and unlatching the door.

FIG. 4 illustrates an electro-mechanical access control system, generally referenced as 20, that functions to configure door 14 between locked and unlocked configurations. Electromechanical access control system 20 is preferably powered by a battery power source 21. In one contemplated embodiment battery power source 21 includes 4 AAA batteries, however any suitable battery configuration is considered within the scope of the present invention. The electro-mechanical access control system 20 includes a micro-controller, generally referenced as 22, having a central processing unit (CPU) 22A, a database module 22B, and an access control sensor 22C. Access control system 20 functions to record a master key card or master smart device, such as a smart phone or tablet computer as well as unlocking the access door when presented with an appropriate “open” signal. Electro-mechanical access control system 20 further includes a failover power source 23A for providing power redundancy, and a current supervisory circuit 23B that monitors parameters of the system such that they are maintained within predetermined limits. In certain embodiments, failover power source 23A comprises a secondary 3.5 mm phono jack connected on the rear of the storage unit and wired to common collector voltage (Vcc) as an additional way to power the device from the outside of the storage unit. In other embodiments, the failover power source may comprise an additional backup battery. Current supervisory circuit 23B is both a chip and software function which is designed to monitor the batteries capacity to properly lock and unlock the door. When a first low battery reference threshold is met, the user is notified that the batteries need to be changed out. This status can last for months before reaching the second and final low battery threshold which, when reached, causes the system to unlatch the door, whereby the door pops open, allowing access to the contents and will not re-latch until the batteries have been changed.

Figure 5:
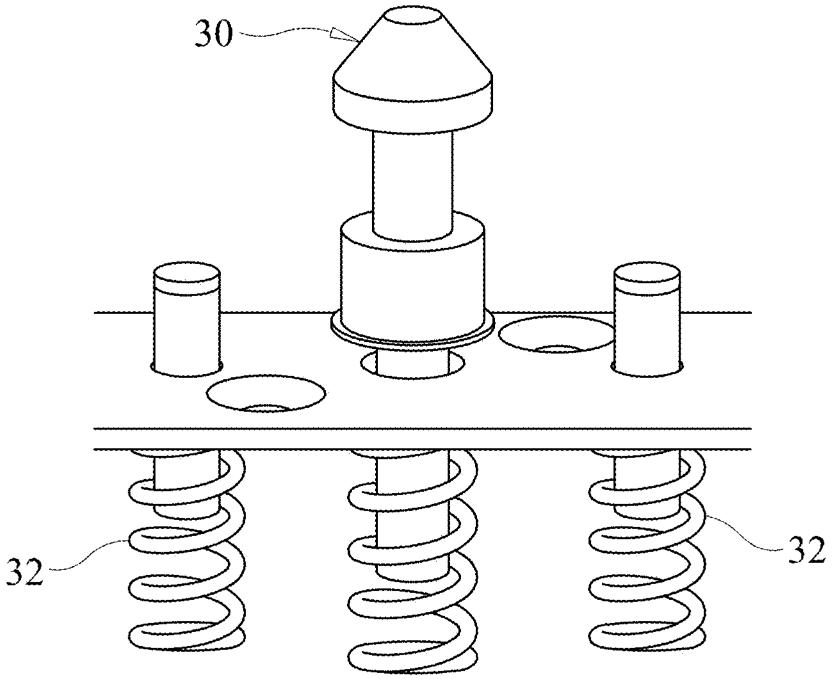
FIG. 5 is a partial detail view of the door pin and compression springs which are mounted to the door.

As best seen in FIGS. 4 and 5, the electro-mechanical access control system further including latching and unlatching components including at least one motor 24 that functions using a worm gear drive (collectively “worm gear drive”) to selectively retract a deadbolt 26 while deadbolt which in turn compresses a deadbolt return spring 28. The use of a worm gear drive to retract the deadbolt is considered significant as it requires substantially less power to operate than other retraction mechanisms, particularly solenoids. As noted, an important aspect of the present invention to provide an energy efficient unit because a refrigerated environment negatively affects battery life. Retraction of deadbolt 26 frees door pin 30 whereby the access door 14 is caused to spring open via a pair of door latch compression springs 32 connected to door 14 and disposed in a compressed configuration by previous closure of the access door. FIG. 4 illustrates the door pin and deadbolts in an unlocked configuration in solid line and a locked configuration in broken line. Once access door 14 is open, and particularly door pin 30 is freed from engagement with deadbolt 26, deadbolt return spring 28 urges deadbolt 26 back to its locking position. Returning door 14 to the closed configuration cause door pin 30 to urge deadbolt 26 move thereby compressing deadbolt return spring 28 until the shoulder 31A of door pin 31 clears whereby deadbolt 26 is urged to the extended/locking position by the potential energy stored by the compressed deadbolt return spring 28. As should be apparent, any suitable number of worm gear drives and deadbolts may be employed.

Figure 6:
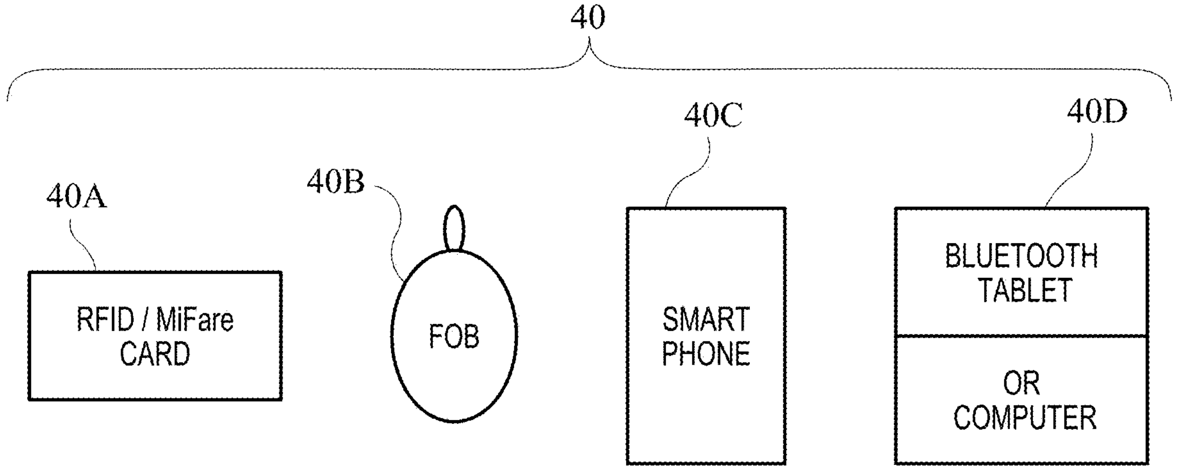
FIG. 6 is a block diagram of the authentication devices which can be used to unlock the storage unit according to the present invention.

As illustrated in FIG. 6, electronic access control system 20 is preferably responsive to an electronic access control device, generally referenced as 40, such as a radio frequency identification device (“RFID”) 40A, a key fob 40B, a wireless signal generated by a smart phone 40C, or a wireless signal generated by a portable computer device 40D. Upon receipt and authentication of the “open” signal, motor 24 activates to retract deadbolt 26 thereby allowing door latch compression springs 32 connected to door 14 to pop the door open by spring action.

Accordingly, the energy stored in door latch compression springs 32 by the user manually closing the door is later used to open the door thereby eliminating the need to draw electrical power from the battery power source 21. In addition, the energy stored in the deadbolt return spring 28 upon retraction of deadbolt 26 is subsequently used to return the deadbolt to its locking position thereby eliminating the need to draw electrical power from the battery power source.

As a result of the extensive use of stored spring energy, the battery power source is capable of lasting up to one year with daily use. Power consumption is held to the micro amp level 90 percent of the time as the system is effectively sleeping until it is presented with credentials to check.

Finally, while the disclosed embodiment has certain components mounted within the enclosure and other components mounted on the door, it is considered an equivalent that the disclosed enclosure mounted components be mounted to the door and the door mounted components be mounted within the enclosure.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A secure electronic enclosure for use within a refrigerated environment, said enclosure comprising:
- a main body having a lockable access door, said access door configurable between a locked closed configuration and an open configuration;
- an electro-mechanical access control system adapted to configure said access door between said locked closed configuration and said open configuration;
- said electro-mechanical access control system including a battery power source;
- said electro-mechanical access control system including at least one electric motor mechanically connected to drive a worm gear drive to selectively move a deadbolt from an extended position to a retracted position, and a deadbolt return spring forced into compression upon retraction of said deadbolt;
- a pin and at least one door latch compression spring;
- wherein said deadbolt engages said pin when said access door is in the locked closed configuration; and
- wherein retraction of said deadbolt frees said access door pin whereby said at least one door latch compression spring causes said access door to spring open;
- wherein said deadbolt return spring returns said deadbolt to said extended position; and
- a current supervisory circuit which monitors said battery power source, said supervisory circuit generating a low battery notification when the battery power source reaches a first reference threshold, and upon reaching a second reference threshold said current supervisory circuit retracts said deadbolt causing said door to spring open.

2. The secure electronic enclosure according to claim 1 wherein said enclosure is devoid of external knobs, handles, grasping structure, or sensors.

3. The secure electronic enclosure according to claim 1, wherein said deadbolt remains retracted preventing said door from latching until said battery power sources is replaced.

4. The secure electronic enclosure according to claim 1, further including a failover power source.

5. A secure electronic enclosure comprising:
- a main body having an access door hingedly connected thereto, whereby said access door in movable between an open configuration and a closed configuration;
- an electro-mechanical access control system adapted to automatically lock said access door when configured from the open configuration to the closed configuration;
- said electro-mechanical access control system including a battery power source;
- said electro-mechanical access control system including at least one electric motor mechanically connected to drive a worm gear that moves a deadbolt from an extended position to a retracted position;
- a deadbolt return spring forced into compression upon retraction of said deadbolt;
- a pin and at least one door latch compression spring, said door latch compression spring forced into compression when said door is disposed in the closed configuration;
- wherein said deadbolt engages said pin when said access door is in the closed configuration thereby locking said access door; and
- wherein retraction of said deadbolt frees said pin whereby said at least one door latch compression spring causes said access door to spring open;
- wherein said deadbolt return spring returns said deadbolt to said extended position; and
- a current supervisory circuit which monitors said battery power source, said supervisory circuit generating a low battery notification when the battery power source reaches a first reference threshold, and upon reaching a second reference threshold said current supervisory circuit retracts said deadbolt causing said door to spring open.

6. The secure electronic enclosure according to claim 5 wherein said enclosure is devoid of external knobs, handles, grasping structure, or sensors.

7. The secure electronic enclosure according to claim 5, wherein said deadbolt remains retracted preventing said door from latching until said battery power sources is replaced.

8. The secure electronic enclosure according to claim 5, further including a failover power source.

* * * * *